(12) United States Patent
Deshmukh et al.

(10) Patent No.: US 11,546,024 B2
(45) Date of Patent: *Jan. 3, 2023

(54) SYSTEM AND METHOD FOR DYNAMIC SINGLE-RADIO AND DUAL-RADIO MODE SELECTION FOR DL MU-MIMO

(71) Applicant: Hewlett Packard Enterprise Development LP, Houston, TX (US)

(72) Inventors: Amogh Guruprasad Deshmukh, Santa Clara, CA (US); Eldad Perahia, Park City, UT (US); Sachin Ganu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,876

(22) Filed: Jun. 22, 2021

(65) Prior Publication Data

US 2022/0029668 A1 Jan. 27, 2022

Related U.S. Application Data

(63) Continuation of application No. 16/940,273, filed on Jul. 27, 2020, now Pat. No. 11,057,083.

(51) Int. Cl.
*H04B 7/0452* (2017.01)
*H04B 7/0417* (2017.01)
(Continued)

(52) U.S. Cl.
CPC ......... *H04B 7/0452* (2013.01); *H04B 7/0421* (2013.01); *H04B 7/0482* (2013.01); *H04W 72/042* (2013.01)

(58) Field of Classification Search
CPC ...... H04B 7/0452; H04B 7/0413; H04B 1/16; H04B 7/0421; H04B 7/0482; H04L 5/0023; H04L 5/0005; H04W 72/042
See application file for complete search history.

(56) References Cited

U.S. PATENT DOCUMENTS

2017/0111092 A1 4/2017 Goyal et al.
2017/0181164 A1 6/2017 Tandai et al.
(Continued)

FOREIGN PATENT DOCUMENTS

CN 107431589 A 12/2017

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall description; Stage 2", Release 16, 3GPP TS 36.300 V16.1.0, Mar. 2020, 8 pages.

(Continued)

*Primary Examiner* — David S Huang
(74) *Attorney, Agent, or Firm* — Sheppard Mullin Richter & Hampton LLP

(57) ABSTRACT

Systems and methods are provided for optimizing channel bandwidth while increasing downlink multi-user, multiple-input, multiple-output (DL MU-MIMO) gain. Depending on the access point (AP) platform, for example, APs exhibit certain characteristics regarding DL MU-MIMO gain as a function of the number of DL MU-MIMO clients associated to the AP. Accordingly, APs can be configured to operate in accordance with an algorithm that checks the number of DL MU-MIMO capable clients are associated to an AP, and dynamically switch between single- and dual-radio modes of operation to take advantage of those DL MU-MIMO gains.

20 Claims, 9 Drawing Sheets

(51) Int. Cl.
*H04W 72/04* (2009.01)
*H04B 7/0456* (2017.01)

(56) References Cited

U.S. PATENT DOCUMENTS

2017/0331670 A1* 11/2017 Parkvall ............... H04B 7/0617
2018/0310279 A1   10/2018 Pathak et al.
2019/0386718 A1   12/2019 Sengupta et al.

OTHER PUBLICATIONS

Hewlett Packard Enterprise, "Aruba AP-345 (RW) Dual 4×4:4 MU-MIMO Radio Access Point with internal Antennas, Smart Rate, for Standardised Campus Networks (JZ031 A)", Digital Data Sheet, 2017, 9 pages.

* cited by examiner

SYSTEM AND METHOD FOR DYNAMIC SINGLE-RADIO AND DUAL-RADIO MODE SELECTION FOR DL MU-MIMO

DESCRIPTION OF RELATED ART

Wireless digital networks are becoming ubiquitous in enterprises, providing secure and cost-effective access to resources. Those networks usually have one or more controllers, each controller supporting a plurality of access points (AP) deployed through the enterprise. Wi-Fi networks operating in accordance with IEEE 802.11 standards are examples of such networks. Wireless network communications devices (also referred to as stations or client devices), such as personal computers and mobile phones transmit data across wireless digital networks vis-à-vis Wi-Fi APs, and cellular network APs, for example.

Wireless local area network (WLAN) infrastructure elements or components in a Wi-Fi network provide service to WLAN devices. In providing this service, radio frequency (RF) characteristics of the links between the AP and client devices may be determined in order to optimize the transmission and/or receipt of data. These RF characteristics can include, for example, path loss and channel coefficients.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
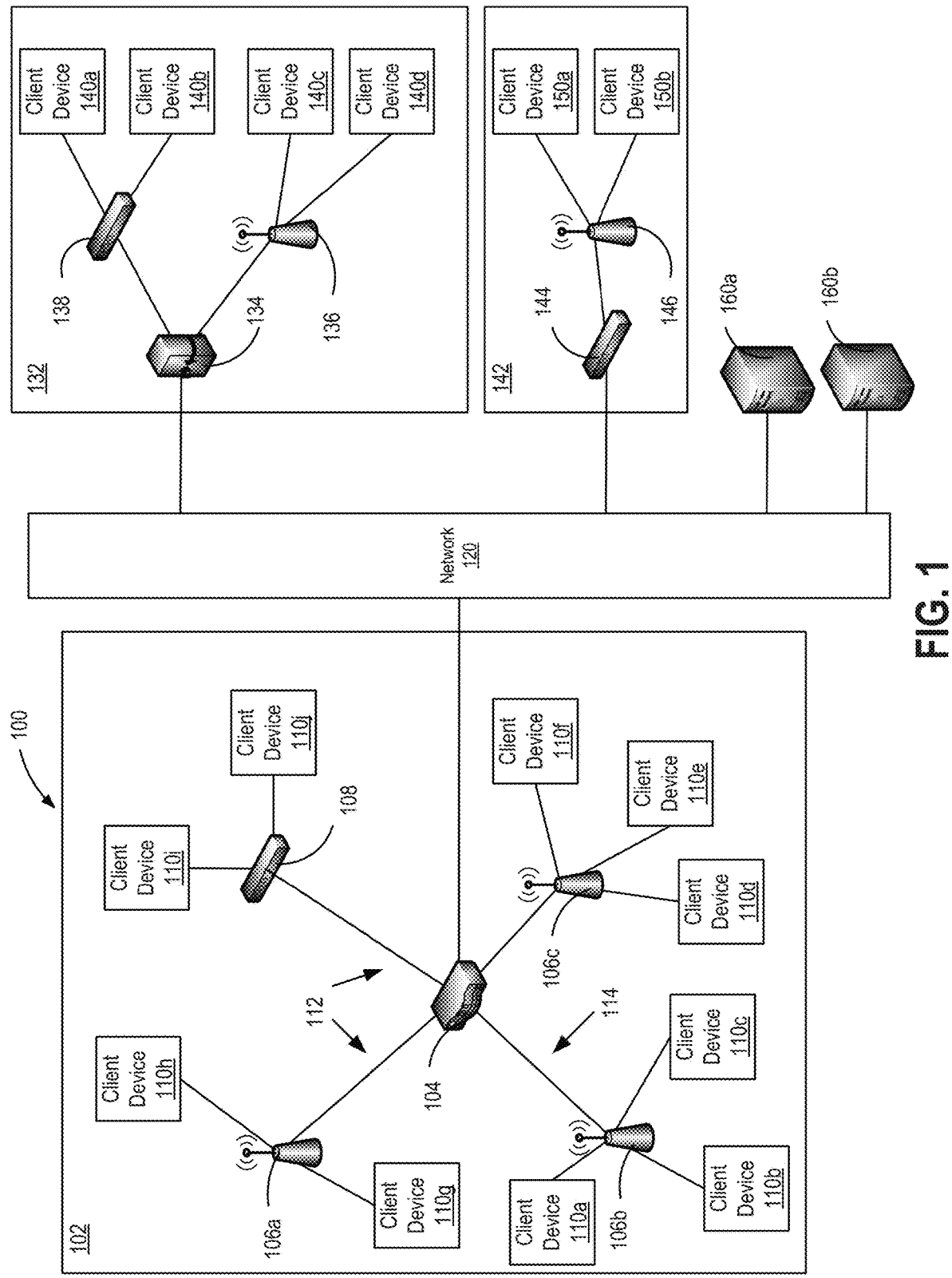
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Multi-User, Multiple-Input and Multiple Output (MU-MIMO) provides a mechanism for a wireless network device to transmit to multiple client devices at the same time. A wireless network device may be a network device, such as for example an AP, that provides wireless connectivity to a network. Without MU-MIMO enabled, the network device may have to transmit to each associated client device one at a time. With MU-MIMO, because the wireless network device is able to transmit to multiple client devices at the same time, the wireless network device is able to transmit more data more frequently. This can improve the rate of data being transmitted to some or all of the associated client devices. MU-MIMO is defined in the Institute of Electrical and Electronics Engineers (IEEE) 802.11 specification.

When employing MU-MIMO, a wireless network device may group two or more client devices, and transmit beamformed signals to each group. MU-MIMO may be more efficient when a group of client devices that are to receive MU-MIMO transmissions are receiving frames with similar traffic characteristics. Because the network device is transmitting to all the client devices at the same time, the transmissions may be more efficient when the frames being transmitted are similar in size. Furthermore, the interval between MU-MIMO transmissions may be minimized when the network device receives incoming frames at about the same time.

In the 802.11ax High Efficiency WLAN standard, one manner in which the aforementioned efficiency may be achieved is by scheduling MU transmissions for both downstream/downlink (from an AP) and upstream/uplink (from client devices) transmissions. The scheduling of downlink (DL) MU transmissions has been addressed in the context of 802.11ac solutions that use MU channel sounding and beamforming to minimize the interference between different client devices that are part of the same MU transmission.

Also, certain APs can be converted or configured to operate according to different modes, e.g., single-radio or multi-radio modes. It should be understood that in single-radio mode, a single radio operates on a given band, whereas in a multi-radio mode, such as a dual-radio mode, the radio chains of a radio can be grouped while operating on a given band. That is, an AP may be configured to operate using logical or physical radios such that an AP can operate in single-radio mode where a single radio can utilize a given channel bandwidth allocation, e.g., 80 MHz, or in dual-radio mode where the single radio can be split into two radios, each utilizing 40 MHz of the 80 MHz channel bandwidth allocation. For example, recently developed APs may comprise dual-band radios that can operate with eight radio chains in the 5 GHz band and four radio chains in the 2.4 GHz band. At runtime, the 5 GHz radio can be converted into two logical or physical radios each operating with four radio chains on the 5 GHz band.

As used herein, the term "radio chain" can refer to hardware that can transmit and/or receive information via radio signals. Wireless client devices and/or other wireless devices can communicate with a network device on a communication channel using multiple radio chains. As used herein, the term "communication channel" (or channel) can refer to a frequency or frequency range utilized by a network device to communicate (e.g., transmit and/or receive) information. A radio chain can include two antennas such as a horizontal antenna and a vertical antenna, among other possibilities. As used herein, the term "antenna" refers to a device that converts electric power into radio waves, and/or vice versa.

A network with APs capable of DL MU-MIMO can experience increased network performance and efficiency. However, hardware restrictions, e.g., supportable spatial streams, and MU sounding overhead can end up limiting the DL MU-MIMO gain of the AP. However, simply replicating channel bandwidth supported by an AP (in single-radio mode) in dual-radio mode is not possible because total channel bandwidth is allocated by a network management entity on a per-AP basis. For example, the network management entity may allocate the channel and transmit power to the APs in a way that ensures the co-channel and adjacent channel interference is minimized. Thus, if an AP is allocated an 80 MHz channel bandwidth, the AP, by operating in dual-radio mode, can double the number of client devices it supports as each radio supports the same number of MU clients in dual-radio mode, but only across a 40 MHz channel bandwidth.

Various embodiments allocate channel bandwidth in accordance with an algorithm that attempts to double DL MU-MIMO gain while optimizing channel bandwidth. In some embodiments, DL MU-MIMO capable clients are identified. A DL MU-MIMO capable client count is defined, which can be incremented as the DL MU-MIMO capable clients are identified. The AP continues to serve these clients using single-radio mode to achieve the benefits of a full given channel bandwidth. However, if the DL MU-MIMO capable client count exceeds a minimum threshold, the secondary radio is dynamically enabled such that the single radio is split into two radios each using half the channel bandwidth of the total allocated channel bandwidth. Client steering can be performed to load balance the MU clients across the two radios, doubling the MU gain. When the DL MU-MIMO capable client count reaches a maximum threshold, the AP reverts back to single-radio mode where the AP can use the larger channel bandwidth.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 132 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2A:
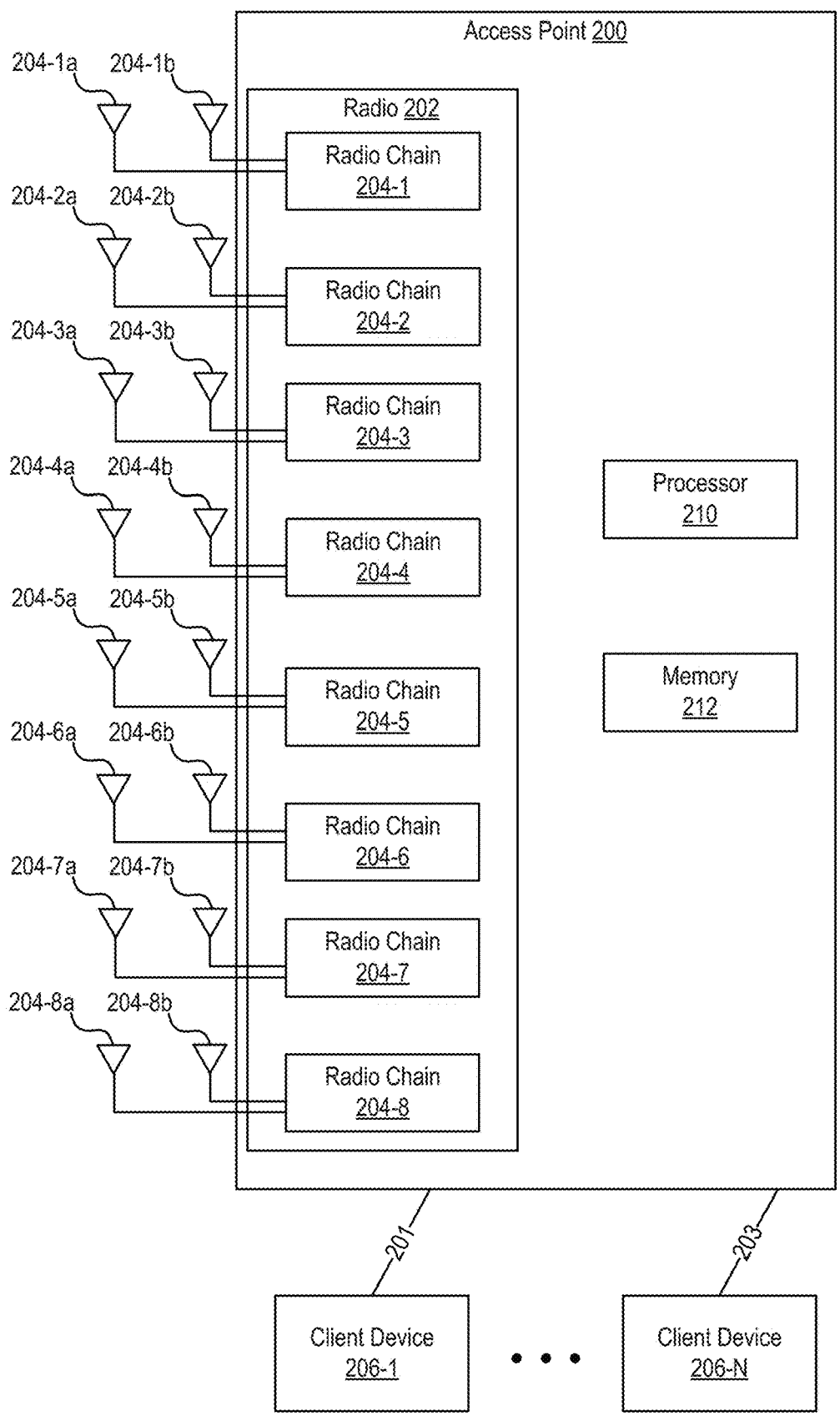
FIG. 2A illustrates an example access point within which various embodiments may be implemented.

FIG. 2A illustrates an example AP 200, which may be an embodiment of one of the APs of FIG. 1 (e.g., APs 106a-c). An AP can refer to a networking device that allows a wireless client device to connect to a wired or wireless network, and need not necessarily be limited to IEEE 802.11-based APs. An AP can include a processing resource, e.g., processor 210, a memory, e.g., memory 212, and/or input/output interfaces (not shown), including wired network interfaces such as IEEE 802.3 Ethernet interfaces, as well as wireless network interfaces such as IEEE 802.11 Wi-Fi interfaces, although examples of the disclosure are not limited to such interfaces.

AP 200 can include a radio 202 which may be a 5 GHz radio including eight radio chains, 204-1, 204-2, 204-3, 204-4 . . . , 204-8. Each radio chain may include two antennas (204-1a, 204-1b. 204-2a, 204-2b, 204-3a, 204-3b, 204-4a, 204-4b . . . , 204-8a, 204-8b). For instance, each radio chain can include a horizontal antenna and a vertical antenna, among other possibilities. Each radio chain is available for both transmitting and receiving data. It should be understood that examples of the present disclosure are not so limited. Although not shown in FIG. 2A for clarity and so as not to obscure examples of the present disclosure, each of the radio chains can be connected to the plurality of antennas via a RF switch.

Figure 2B:
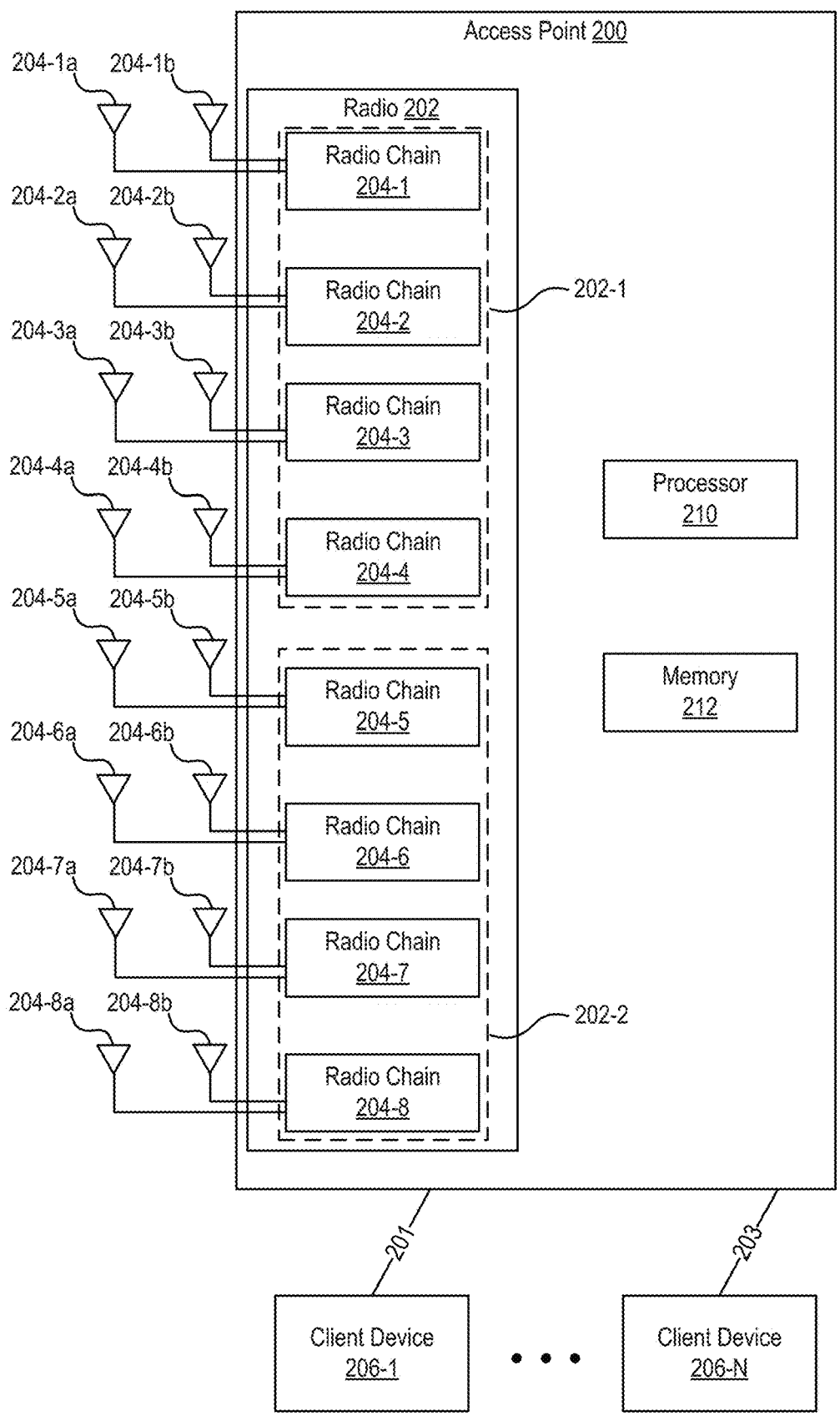
FIG. 2B illustrates a multi-radio configuration of the example access point of FIG. 2A allowing for increased DL MU-MIMO gain and optimized channel bandwidth.

As illustrated in FIG. 2B, the eight radio chain 5 GHz radio, i.e., radio 202, may be converted at runtime, into two radios (202-1 and 202-2) operating simultaneously with four radio chains each (204-1 to 204-4, and 204-5 to 204-8). Thus, AP 200 may operate using two radios (dual-radio mode) simultaneously. For example, radio 202-1 can be dedicated to a first communication channel 201 in a first communication channel group, and radio 202-2 can be dedicated to a second communication channel 203 in a second communication channel group.

As mentioned, in some examples the communication band can be a 5.0 GHz UNII band. Communication channels (and mid-point frequencies) operating on the 5 GHz communication band can include 36 (5.180 GHz), 40 (5.200 GHz) 44 (5.220 GHz), and 149 (5.745 GHz), among others. In such examples, AP 200 can provide network connectivity to wireless client devices 206-1 on communication channel 201 (e.g., communication channel 36) included in a first communication channel group that is different from another communication channel 203 (e.g., communication channel 44) included in a second communication channel group that provides network connectivity to a different wireless client device such as wireless client device 206-N. That is, communication channel 201 is a communication channel that is different from communication channel 203. While illustrated as an individual communication channel it is understood that the first communication channel group and/or the second communication channel group can include a plurality of communication channels.

Moreover, it should be understood that each channel in the 5 GHz band occupies a 20 MHz portion of the spectrum in this example, although in other examples, channels may span, e.g., 40, 60, 80, or 160 MHz frequency bands depending on the regulations/country constraints. It should be understood that the present disclosure is not limited to splitting channels in the 5 GHz band in this manner, nor is the present disclosure limited to splitting channels in the 5 GHz band. For example, various embodiments contemplate application to the future 6 or 7 GHz modes of operation.

In some examples, the first communication channel group can include a plurality of communication channels with each communication channel of the plurality of communication channels is to operate on a communication band (e.g., 5.0 GHz UNII band) and operate in accordance with the particular wireless specification (e.g., 802.11ax). For example, by operating in accordance with the particular specification such as IEEE 802.11ax, each communication channel in the first communication channel group can employ OFDMA, spatial reuse, uplink multiuser multiple-input and multiple-output (UL MU-MIMO), and/or combinations thereof. By extension, a wireless client device having a capacity of complying with the particular wireless specification can, in such examples, have the capacity for employing OFDMA, spatial reuse, UL MU-MIMO, and/or combinations thereof.

Figure 3:
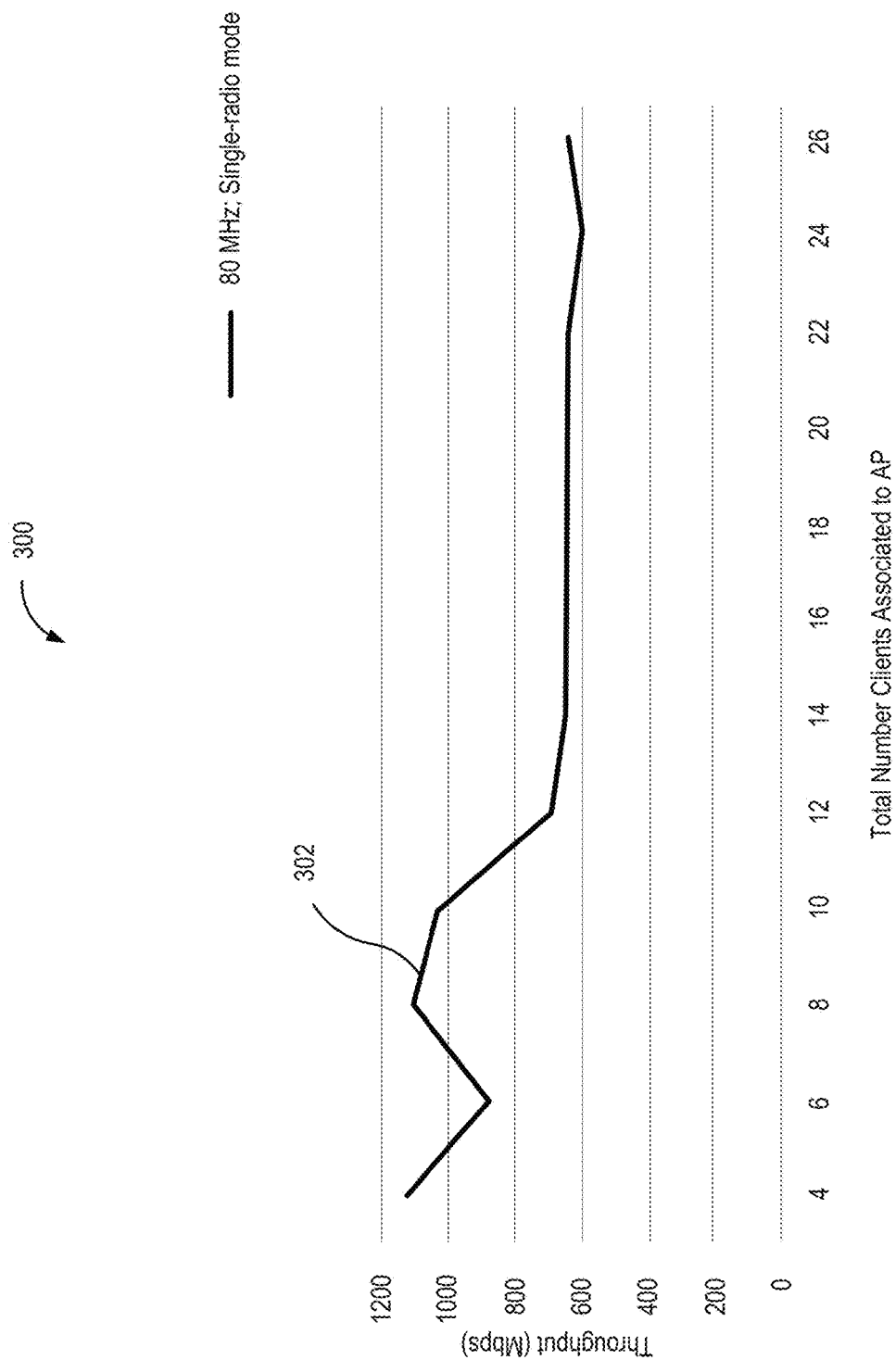
FIG. 3 is an example graph illustrating throughput as a function of the number of clients associated with an AP operating in single-radio mode.

FIG. 3 is an example graph 300 illustrating example throughput 302 in Mbps as a function of the number of clients associated to an AP which is operating in single-radio mode. Following the above examples, the AP may be allocated an 80 MHz channel bandwidth to support associated clients. It can be appreciated that after about six clients are associated to the AP operating in single-radio mode, MU gain begins to decrease. As more clients associate to the AP, the MU gain lessens/levels off to approximately 600 Mbps, almost one-half the MU gain realized when four and eight clients are attached. Thus DL MU-MIMO client scaling performance decreases after a particular number of DL MU-MIMO clients associate to an AP in single-radio mode. It should be understood that this behavior is independent of the channel bandwidth allocated to the AP. It should also be noted that various examples described herein are for illustration and understanding, and not meant to be limiting in any way regarding, e.g., client count, throughput, etc.

As alluded to above, dual-radio APs, such as dual 5 GHz radio APs, are able to operate using two separate radios behaving identically to each other, each radio having the same benefits and limitations. In this way, the number of DL MU-MIMO clients supported on the AP can be increased, doubled in particular. That is, each radio supports the same number of MU clients when dual 5 GHz mode is activated. Ideally, with a dual-radio AP, such as a dual 5 GHz AP, DL MU-MIMO gain will be twice that of the AP operating in single-radio mode, e.g., using a single 5 GHz radio, considering each of the dual 5 GHz radios has the same channel bandwidth as that of the single radio. However, the channel bandwidth supported by the AP in single-radio mode cannot simply be replicated when the AP is operating in dual-radio, e.g., dual 5 GHz, mode. Again, the total channel bandwidth is allocated by a network management entity on a per-AP basis.

Frequency spectrum is a limited resource and to optimize its usage, a network management entity may allocate a channel and transmit power to APs in a typical deployment. During this allocation of resources, the network management entity ensures that co-channel and adjacent channel interference is minimized, and the AP attempts to maximize its performance and the user experience with the allocated resources, whether operating in single-radio mode or dual-radio mode.

Experiments were conducted with various multi-radio APs, such as those capable of operating in dual-radio mode.

Figure 4:
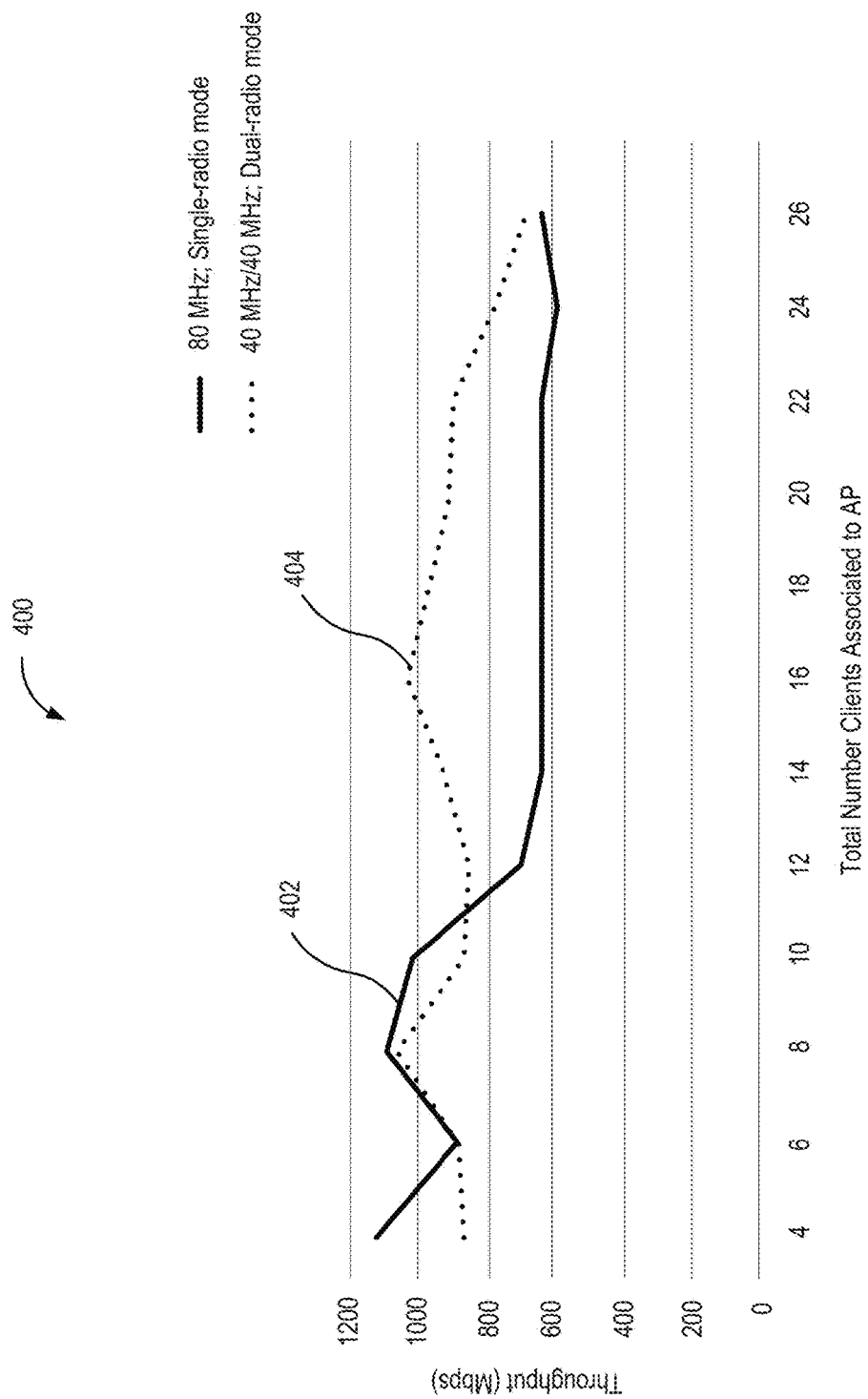
FIG. 4 is an example graph comparing throughput as a function of the number of clients associated with an AP operating in single radio mode and in dual-radio mode.

It should be noted that although some embodiments disclosed herein are described in the context of dual-radio modes of operation, embodiments can be adapted for use with other modes of operation, e.g., tri-radio modes of operation, multi-band modes of operation, etc. One such AP is an AP that can support eight DL MU-MIMO clients, and is capable of four spatial streams. Thus, the AP can accommodate DL MU-MIMO operation for up to four clients simultaneously with a single spatial stream each by forming four client MU groups. As illustrated in FIG. 4, and similar to the example graph 300 (FIG. 3), example graph 400 also reflects that DL MU-MIMO throughput performance 402 peaks when about four clients or when about eight clients are associated to the AP when operating in single-radio mode. That is, when four clients or eight clients are associated to the AP in single-radio mode, the throughput of the AP is almost 1200 Mbps. However, upon, e.g., ten clients associating to the AP, throughput begins to drop to, e.g., approximately 1000 Mbps, and the throughput continues to decrease. When about 14 clients are associated to the AP, throughput essentially plateaus at about 600 Mbps.

When the same AP is operating in dual-radio mode, the AP is configured to operate using two 5 GHz radios simultaneously, where the original 80 MHz channel bandwidth allocation is split between the two 5 GHz radios in a 40 MHz/40 MHz split. As illustrated in FIG. 4, throughput 404 of the AP when operating in dual-radio mode also peaks when about 8 or 16 clients (spread equally across both 5 GHz radios) associate to the AP. Initially, the throughput peaks when about 8 clients have associated to the AP. Thereafter, throughput or MU gain begins to decrease, and stabilizes after about 12 clients have associated to the AP. When about 16 clients have associated to the AP, throughput 404 again peaks (almost double that of throughput 402 with the same number of associated clients). Although throughput 404 decreases somewhat, throughput 404 (DL MU-MIMO gain) remains higher than that of the AP when operating in single-radio mode (throughput 402) until they begin to converge at about 26 associated clients.

Based on the different PHY layer data rates for different channel bandwidths, the absolute throughput value is different for different channel bandwidths but the nature of the curve for DL MU-MIMO client scaling remains similar. DL MU-MIMO gain starts decreasing after the association of about eight clients, and after about 12 clients the throughput 404 stabilizes at a lower level due to the predominance of single user (SU) traffic.

As illustrated in FIG. 5, example graph 500 again reflects DL MU-MIMO throughput 502 peaking when about four clients or when about eight clients are associated to the AP when operating in single-radio mode. In this example, the AP is allocated a 40 MHz channel bandwidth, total. Afterwards, as more clients associate to the AP, throughput 502 begins to decrease, bottoming out at approximately 325 Mbps when about 14 (or more) clients have associated to the AP.

Figure 5:
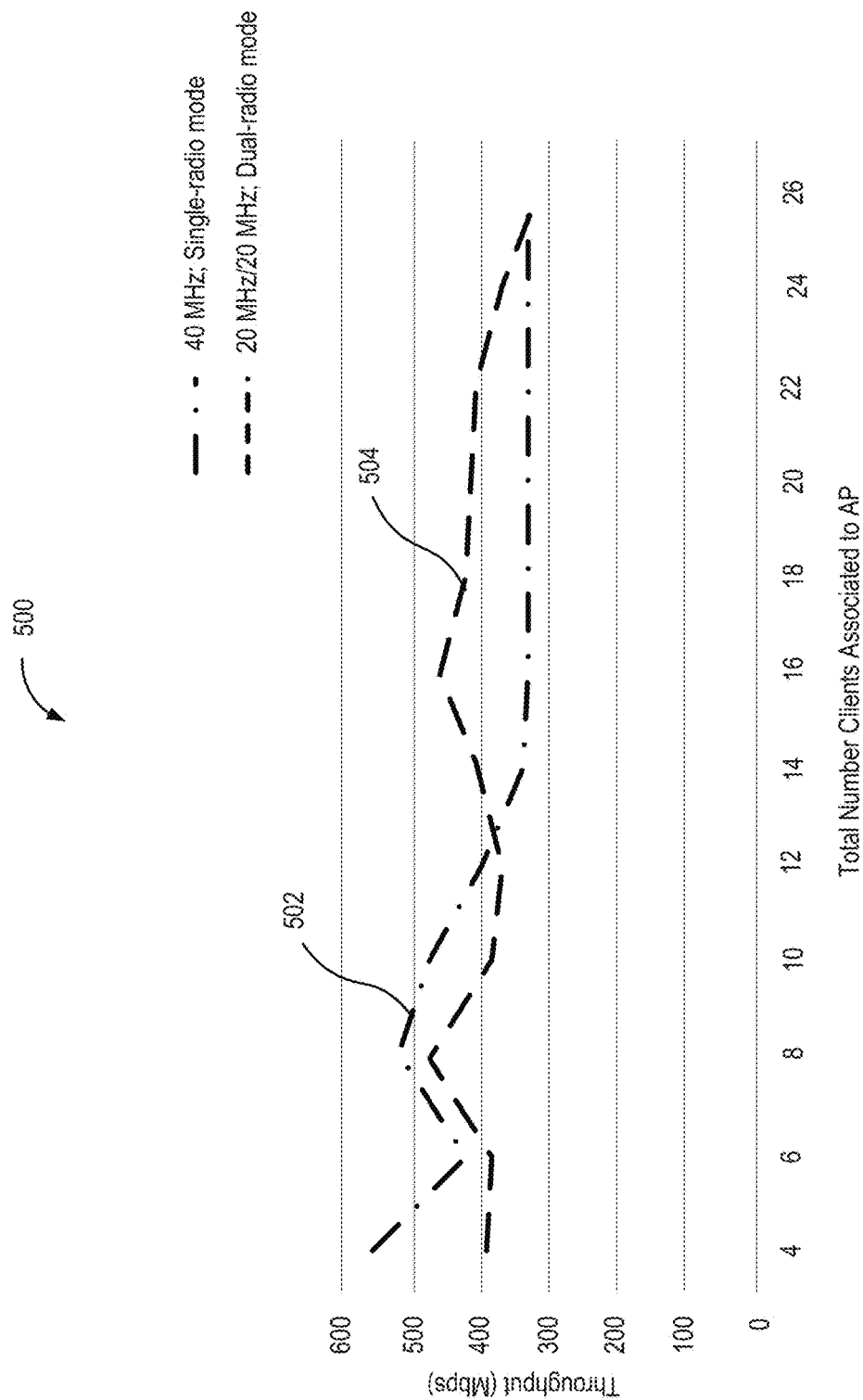
FIG. 5 is another example graph comparing throughput as a function of the number of clients associated with an AP operating in single-radio mode and in dual-radio mode.

When the same AP is operating in dual-radio mode, the AP is configured to operate using two 5 GHz radios simultaneously, where the original 40 MHz channel bandwidth allocation is split between the two 5 GHz radios in a 20 MHz/20 MHz split. As illustrated in FIG. 5, throughput 504 of the AP when operating in dual-radio mode peaks when about 8 clients or about 16 clients (spread equally across both 5 GHz radios) associate to the AP. When anywhere from about 14 clients to 24 clients associate to the AP, where the AP is operating in dual-radio more, throughput 504 remains higher than throughput 502. A similar DL MU-MIMO gain is seen for the AP when operating in (20+20 MHz) dual 5 GHz radio mode versus (40 MHz) single-radio mode.

Because of these operational characteristics of APs when operating in dual-radio mode, an AP can be configured to operate in such a way that throughput using DL MU-MIMO can be optimized or increased (with some amount of consistency). In particular, for DL MU-MIMO traffic, dual-(X+X) radio mode is better than single- (Y) radio mode. When considering the 5 GHz frequency band, in this example, X can be 20/40 MHz, and Y can be 40/80 MHz, respectively when client scaling from a minimum threshold number of clients to a maximum threshold number of clients associated to the AP. In the above-described examples, a minimum threshold number of clients is 10 clients, and a maximum threshold number of clients is 24. In other words, between these thresholds, or within this window/slot, DL MU-MIMO throughput or gain can be increased, and in particular, almost doubled when the number of clients associated to an AP falls between 10 and 24 clients and the AP is operating in dual-radio mode. Outside of those thresholds, throughput or DL MU-MIMO gain when the AP is operating in single-radio mode, is the same or at least, not practically worse than when the AP is operating in dual-radio mode. It should be understood that the minimum and maximum threshold numbers of clients can vary depending on the channel bandwidth allocated to an AP, along with other factors, e.g., the particular AP platform memory and CPU for each radio. Accordingly, various embodiments, described in greater detail below, are able to double the DL MU-MIMO gain while optimizing the channel bandwidth when appropriate, and can operate using a single radio across the entirety of the channel bandwidth when appropriate to optimize channel bandwidth.

Figure 6:
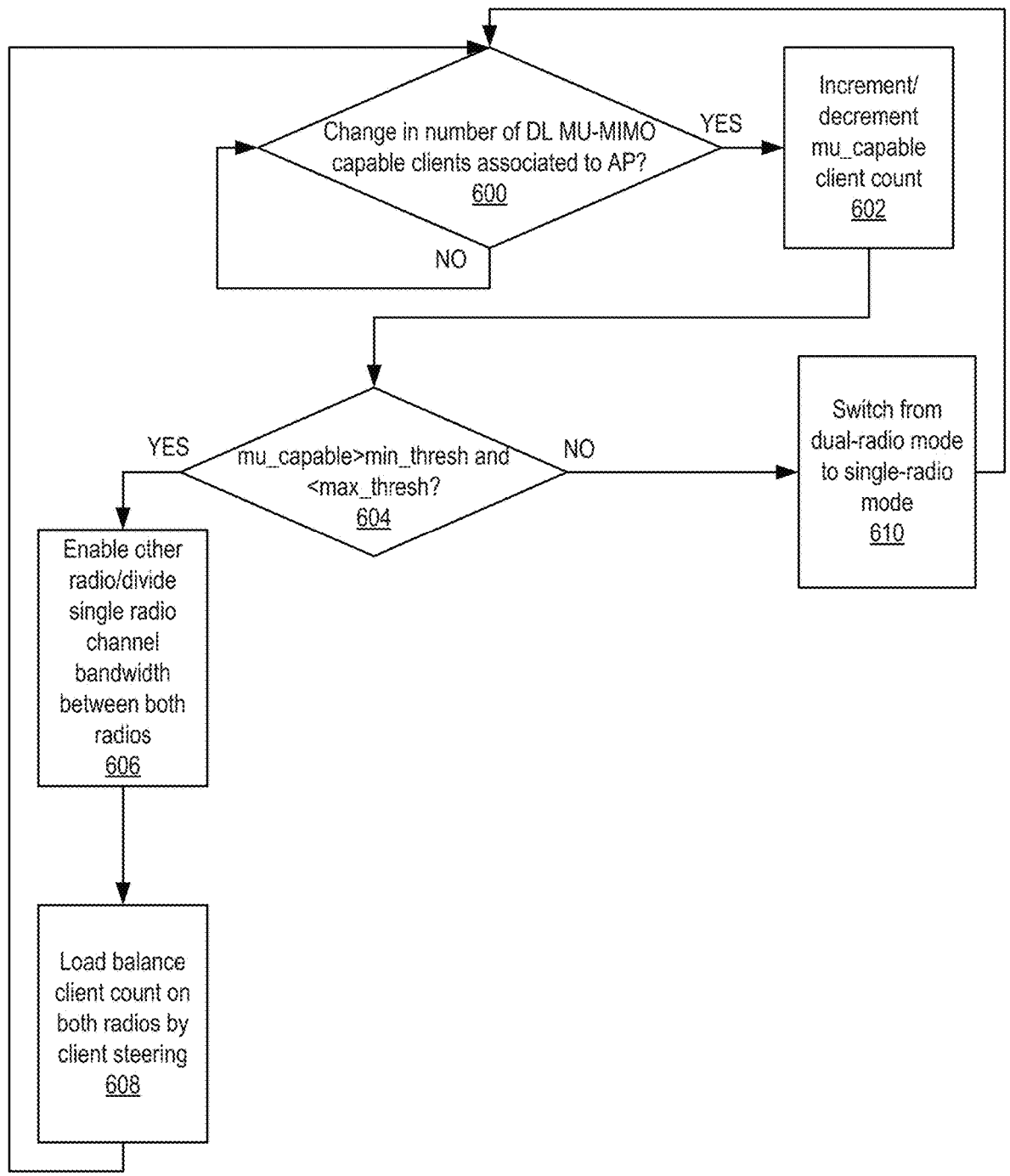
FIG. 6 is a flowchart illustrating example operations for effectuating dynamic single-radio and dual-radio mode selection.

FIG. 6 is a flow chart illustrating example operations that may be performed to effectuate an increase in DL MU-MIMO gain while optimizing channel bandwidth in accordance with one embodiment. An AP may be operating in single-radio mode or dual-radio mode. For example, the AP may be allocated 80 MHz channel bandwidth, e.g., by a network management entity. Clients, as described above, may associate with the AP. At 600, the AP or an AP controller may check to determine if the number of DL MU-MIMO capable clients has changed. A client count "mu_capable" may be defined and at 602, if a DL MU-MIMO capable client has been identified, the mu_capable client count is incremented or decremented accordingly. The AP will continue to serve these clients using the 80 MHz channel bandwidth so that the clients still benefit from 80 MHz DL MU-MIMO operation.

Operation may progress to 604, where a check is performed to determine if the mu_capable client count exceeds the minimum threshold number of clients "min_threshold." Additionally, a check is performed to determine if the mu_capable client count is less than the maximum threshold number of clients "max_threshold." As described above, between a particular minimum and maximum threshold number of clients associated to an AP, DL MU-MIMO gain can be increased, e.g., doubled, by operating the AP in dual-radio mode, while also optimizing channel bandwidth outside of those thresholds. Therefore, if the check results in a determination whereby the mu_capable client count is greater than the min_threshold but less than the max_threshold, the other radio can be enabled, dynamically, so that the AP is operating in dual-radio mode. The allocated channel bandwidth (e.g., 80 MHz) can be divided equally between the radios so each radio is allocated, in this example, a 40

MHz channel bandwidth. If however, those two conditions are not met, the AP is maintained in single-radio mode.

After dual-radio mode is enabled at 606, load balancing may be performed at 608 on the associated clients via client steering in accordance with steering techniques known now, e.g., 802.11v, or in the future. The AP will serve these clients with DL MU-MIMO traffic using 40 MHz as it is known that DL MU-MIMO gain effectively doubles when the AP is operating in dual-radio mode (40+40 MHz) versus operating in single-radio mode (80 MHz) when the client count on the AP is between the determined min_threshold and max_threshold number of clients. Upon load balancing, the process may return to operation 600. In this way, continuous monitoring can be performed.

However, if (at 604), a determination is made that mu_capable client count on the AP exceeds the max_threshold number of clients, at 610, the dual-radio mode can be disabled, and the channel bandwidth for the single radio can return to 80 MHz, i.e., can be doubled. Operation may then return to 600, where again a check for a change in the number of DL MU-MIMO capable clients can be performed.

It should be understood that the mu_capable client count limitation is dependent upon the AP platform as this limit will be different for various platforms based on the aforementioned scheme or algorithm. It should also be understood that the operations described above may be performed in real-time so that the AP or AP controller can dynamically switch between the single- and dual-radio modes of operation depending on a current state of client association to the AP, allowing the AP to dynamically optimize channel bandwidth and DL MU-MIMO gain.

Figure 7:
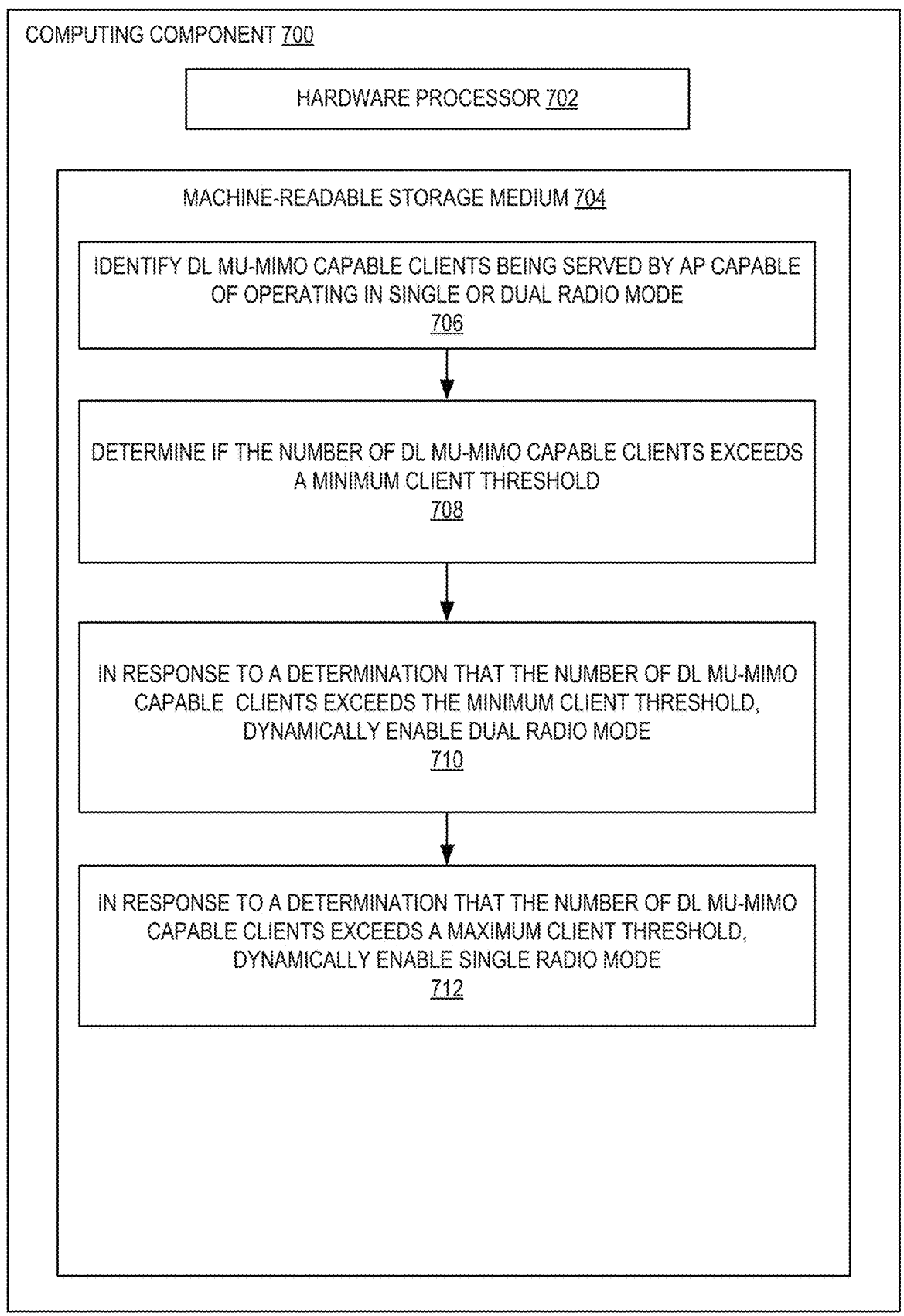
FIG. 7 is a block diagram of an example computing component or device for dynamic single-radio and dual-radio mode selection in accordance with one embodiment.

FIG. 7 is a block diagram of an example computing component or device 700 for separating radio chains between mission-critical devices and enterprise clients in accordance with one embodiment. Computing component 700 may be, for example, a server computer, a controller, or any other similar computing component capable of processing data. In the example implementation of FIG. 7, the computing component 700 includes a hardware processor, 702, and machine-readable storage medium, 704. In some embodiments, computing component 700 may be an embodiment of an AP processor or AP controller, e.g., processor 210 of AP 200, for example. More particularly, computing component 700 may be a component of a central entity such as wireless mobility controller in the network.

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-712. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-712.

Hardware processor 702 may execute instruction 706 to identify DL MU-MIMO capable clients being served by an AP capable of operating in single- or dual-radio mode. As discussed above, APs can be configured to group radio chains to effectuate one or more radios allowing more clients to be served simultaneously. A network management entity may allocate a particular channel bandwidth to each AP, e.g., an 80 MHz channel bandwidth, across which the AP/its radio(s) may operate. If DL MU-MIMO clients are associated to the AP, a DL MU-MIMO-capable client count or counter can be defined, and upon identifying a change in the number DL MU-MIMO-capable clients associated to the AP, that count/counter is incremented or decremented accordingly.

As described above, certain operating characteristics of APs reflect a "slot" corresponding to a particular number of clients, that when associated to an AP operating in dual-radio mode, throughput or DL MU-MIMO gain can increase, even double. That slot can be defined or specified in terms of a minimum threshold number of clients and a maximum threshold number of clients. It should be noted that this slot can also be based on other characteristics, e.g., traffic load of the DL MU-MIMO clients. In other words, the slot can be defined in terms of a minimum DL MU-MIMO-capable client traffic load and a maximum DL MU-MIMO-capable client traffic load.

Accordingly, hardware processor 702 may execute instruction 708 to determine if the number of DL MU-MIMO-capable clients exceeds a minimum client threshold. Again, the minimum (and maximum) client threshold can vary depending on the AP/AP platform. For example, a certain model or type of AP can be deployed with the requisite information regarding minimum and maximum client thresholds between which the AP should transition to dual-radio mode operation to maximize DL MU-MIMO gain.

Thus, hardware processor 702 may execute instruction 710 to, in response to a determination that the number of DL MU-MIMO-capable clients exceeds the minimum client threshold, dynamically enable dual-radio mode on the AP. As described above, below the minimum client threshold, the number of associated clients to an AP, regardless of whether the AP is operating in single- or dual-radio mode, equates to similar throughput/DL MU-MIMO gain. However, above that minimum client threshold, and until the maximum client threshold is met, operation in dual-radio mode results in up to double the DL MU-MIMO gain as opposed to when the AP is operating in single-radio mode (with the same number of associated clients).

Thus, hardware processor 702 may execute instruction 712 to, in response to a determination that the number of DL MU-MIMO capable clients exceeds a maximum client threshold or in response to a determination that the number of DL MU-MIMO capable clients falls below the minimum client threshold, dynamically enable single-radio mode. As noted above, when operating in single-radio mode outside the minimum and maximum client thresholds window, the AP's channel bandwidth is optimized inasmuch as the total channel bandwidth allocation for that AP is at the AP's (single) radio's disposal.

Figure 8:
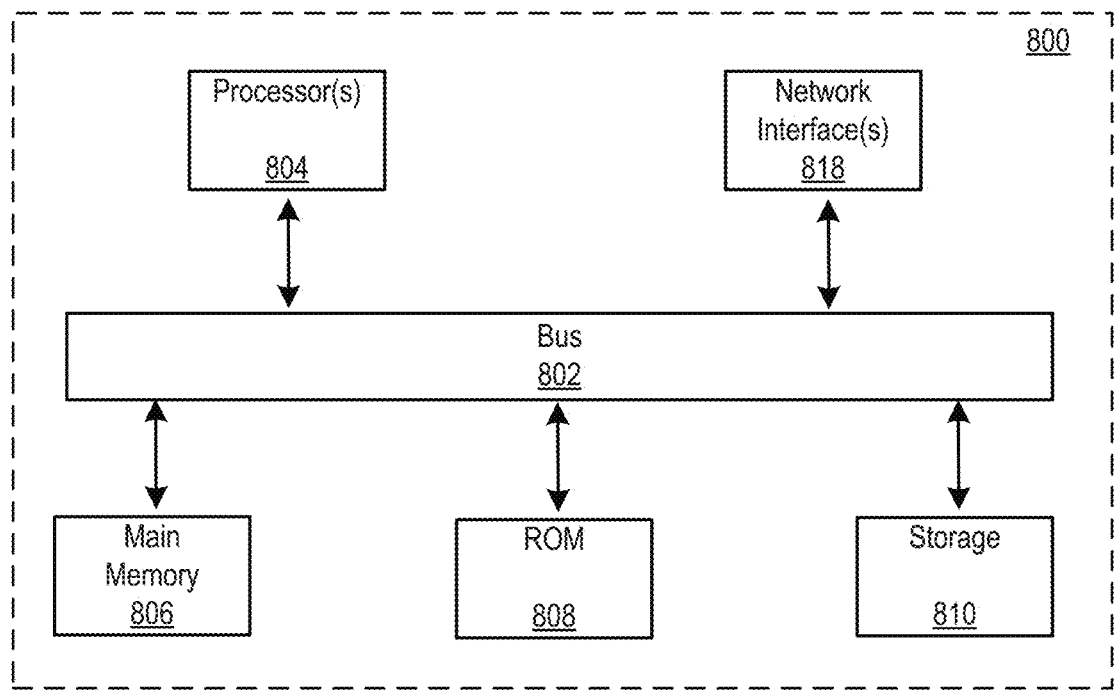
FIG. 8 depicts a block diagram of an example computer system in which various of the embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP), comprising:
a processor; and
a memory unit operatively connected to the processor, the memory unit including instructions that when executed, cause the processor to:
identify downlink multi-user multiple input, multiple output (DL MU-MIMO) capable clients being served by the AP, the AP capable of operating in single- or dual-radio mode;
determine if a number of the identified DL MU-MIMO capable clients exceeds a minimum client threshold;
based on the determination, dynamically enabling dual-radio mode or dynamically enabling single-radio mode.

2. The AP of claim 1, wherein the instructions that when executed cause the processor to identify the DL MU-MIMO capable clients further cause the processor to define a DL MU-MIMO capable client counter.

3. The AP of claim 2, wherein the instructions that when executed cause the processor to identify the DL MU-MIMO capable clients further cause the processor to track a change in number DL MU-MIMO capable clients, and increment or decrement the DL MU-MIMO capable client counter.

4. The AP of claim 1, wherein the minimum client threshold reflects a number of DL MU-MIMO capable clients value at which point DL MU-MIMO gain of the AP while operating in the dual-radio mode comparatively exceeds the DL MU-MIMO gain of the AP while operating in the single-radio mode, or wherein the minimum client threshold reflects a DL MU-MIMO capable client traffic load value at which point DL MU-MIMO gain of the AP while operating in the dual-radio mode comparatively exceeds the DL MU-MIMO gain of the AP while operating in the single-radio mode.

5. The AP of claim 4, wherein the DL MU-MIMO gain of the AP while operating in the dual-radio mode comparatively exceeds the DL MU-MIMO gain of the AP while operating in the single-radio mode.

6. The AP of claim 1, wherein the memory unit includes instructions that when executed further cause the processor to load balance clients associated to the AP across both radios of the AP subsequent to the dynamic enablement of the dual-radio mode.

7. The AP of claim 6, wherein the memory unit includes instructions that when executed cause the processor to serve DL MU-MIMO and single-user (SU) clients associated to the AP across both radios of the AP in accordance with the load balancing.

8. The AP of claim 1, wherein the AP serves clients associated to the AP using a specified channel bandwidth allocated to the AP by a network management entity.

9. The AP of claim 8, wherein the instructions that when executed cause the processor to dynamically enable the dual-radio mode further cause the processor to divide the specified channel bandwidth allocated to the AP between two radios of the AP.

10. The AP of claim 9, wherein the instructions that when executed cause the processor to dynamically enable the single-radio mode further cause the processor to use the specified channel bandwidth allocated to the AP by a single radio in its entirety.

11. The AP of claim 10, wherein the memory unit includes instructions that when executed further cause the processor to disable the single-radio mode of the AP utilized upon the dynamic enablement of the dual-radio mode.

12. A method comprising:
identifying, by an access point (AP), downlink multi-user multiple input, multiple output (DL MU-MIMO) capable clients being served by the AP, the AP capable of operating in single- or dual-radio mode;
determining if a number of the identified DL MU-MIMO capable clients exceeds a minimum client threshold; and
based on the determination, dynamically enabling dual-radio mode or dynamically enabling single-radio mode.

13. The method of claim 12, wherein identifying the DL MU-MIMO capable clients further comprises defining a DL MU-MIMO capable client counter.

14. The method of claim 13, wherein identifying the DL MU-MIMO capable clients further comprising tracking a change in number DL MU-MIMO capable clients, and incrementing or decrementing the DL MU-MIMO capable client counter.

15. The method of claim 12, wherein the minimum client threshold reflects a number of DL MU-MIMO capable clients value at which point DL MU-MIMO gain of the AP while operating in the dual-radio mode comparatively exceeds the DL MU-MIMO gain of the AP while operating in the single-radio mode, or wherein the minimum client threshold reflects a DL MU-MIMO capable client traffic load value at which point DL MU-MIMO gain of the AP while operating in the dual-radio mode comparatively exceeds the DL MU-MIMO gain of the AP while operating in the single-radio mode.

16. The method of claim 15, wherein the DL MU-MIMO gain of the AP while operating in the dual-radio mode comparatively exceeds the DL MU-MIMO gain of the AP while operating in the single-radio mode.

17. The method of claim 12, further comprising load balancing clients associated to the AP across both radios of the AP subsequent to the dynamic enablement of the dual-radio mode.

18. The method of claim 17, further comprising serving DL MU-MIMO and single-user (SU) clients associated to the AP across both radios of the AP in accordance with the load balancing.

19. The method of claim 12, wherein the AP serves clients associated to the AP using a specified channel bandwidth allocated to the AP by a network management entity.

20. The method of claim 19 dynamically enabling the dual-radio mode further comprises dividing the specified channel bandwidth allocated to the AP between two radios of the AP.

* * * * *